United States Patent [19]
Murata et al.

[11] Patent Number: 4,951,789
[45] Date of Patent: Aug. 28, 1990

[54] CLUTCH ASSEMBLY

[75] Inventors: Shigeki Murata, Nara; Jirou Kajino; Hitoshi Minabe, both of Neyagawa, all of Japan

[73] Assignee: Matsushita Electric Industrial Co., Ltd., Osaka, Japan

[21] Appl. No.: 265,334

[22] Filed: Oct. 24, 1988

Related U.S. Application Data

[63] Continuation of Ser. No. 942,629, Dec. 16, 1986, abandoned.

[30] Foreign Application Priority Data

Dec. 17, 1985 [JP] Japan ............................ 60-283479
Feb. 26, 1986 [JP] Japan ............................ 61-41235

[51] Int. Cl.$^5$ ............................................. F16D 11/02
[52] U.S. Cl. ..................................... 192/28; 192/101; 74/337.5
[58] Field of Search ............... 192/26, 28, 30 R, 33 R, 192/71, 74, 89 A, 101; 74/332, 337.5, 369, 373, 431

[56] References Cited

U.S. PATENT DOCUMENTS

| | | | |
|---|---|---|---|
| 1,269,057 | 6/1918 | Criner | 192/28 |
| 1,335,543 | 3/1920 | Alexander . | |
| 2,456,928 | 12/1948 | Curtis | 192/28 |

FOREIGN PATENT DOCUMENTS

| | | |
|---|---|---|
| 1033004 | 6/1958 | Fed. Rep. of Germany . |
| 923353 | 7/1947 | France . |
| 60-26821 | 2/1985 | Japan . |
| 239767 | 9/1925 | United Kingdom . |
| 264588 | 1/1927 | United Kingdom . |
| 84/00199 | 1/1984 | World Int. Prop. O. . |

Primary Examiner—Richard Lorence
Attorney, Agent, or Firm—Wenderoth, Lind & Ponack

[57] ABSTRACT

In a clutch assembly, a driven member is driven by a driving member through an engaging or clutch member which is mounted on the driven member movably between a position to be engaged with the driving member and a position to be released from the driving member. The engaging or clutch member is thrust toward the engaged position by a first thrusting force. A releasing member is movable between an active position to abut at one end thereof against the engaging or clutch member and an inactive position to be apart from the engaging member, and is thrust toward the abutting end by a second thrusting force. When the releasing member abuts against the engaging member, the releasing member is first moved in the opposite direction to the second thrusting force direction by a driving force of the driving member to reach a stop position, and then the engaging member is moved in the direction to be disengaged from the driving member by the driving force of the driving member. The engaging or clutch member is further moved, after having been disengaged from the driving member, by the second thrusting force to reach the released position.

29 Claims, 16 Drawing Sheets

4,951,789

CLUTCH ASSEMBLY

This application is a continuation of now abandoned application Ser. No. 061992,629, filed Dec. 16, 1986.

BACKGROUND OF THE INVENTION

1. FIELD OF THE INVENTION

This invention relates to a clutch assembly capable of changing over transmission and nontransmission of a prime moving force selectively.

2. DESCRIPTION OF THE PRIOR ART

Conventionally, as a clutch assembly to selectively transmit a force of a driving source to a driven object, for example, an engaging clutch is known. For instance, the Japanese Unexamined Patent Publication No. 60-26821 published Feb. 9, 1985 discloses a clutch assembly capable of coupling a driving body to a driven body, by forming a plurality of engaging holes in the driving body, and retractably provided engaging shafts to be engaged with the engaging holes in the driven body, with the driving body and driven body being arranged on the same center line. In this clutch assembly, when transferring from a state of transmitting the driving force with the driving shafts and driven shafts being coupled together to a state of nontransmission, it is necessary to draw back the engaging shafts which are engaged with the engaging holes to be separated from the driving body. At this time, on the contact surface between the engaging holes and engaging shafts, there is a surface pressure P generated, corresponding to the shaft torque being transmitted (that is, the rotary load of the driven body). Supposing the coefficient of friction on the contact surface to be $\mu$, a force $P \times \mu$ is required to isolate the engaging shafts from the engaging holes. Therefore, a considerably large force is needed to separate while transmitting a large shaft torque. Accordingly, when the engaging shafts are moved forward and backward by a solenoid or the like, a very large solenoid is required. In addition, the reliability of action is inferior.

SUMMARY OF THE INVENTION

It is hence a primary object of this invention to present a clutch assembly capable of obtaining a secure changeover action in a simple structure.

To achieve this object, a clutch assembly according to this invention comprises: a driving member; an engaging member movable between a first position where said engaging member engages said driving member and a second position where said engaging member is apart from said driving member: a first thrusting means for thrusting said engaging member toward said first position; a driven member mounting thereon said engaging member and said first thrusting means and driven by said driving member through said engaging member when said engaging member is in said first position; a releasing member movable between a position where said releasing member abuts against said engaging member and a position where said releasing member is apart from said engaging member; and a second thrusting means for thrusting said engaging member through said releasing member toward said second position, wherein said engaging member is moved by a driving force of said driving member to disengage from said driving member when said releasing member abuts against said engaging member, and further moved by the thrusting force of said second thrusting means through said releasing member to said second position after having disengaged from said driving member whereby said driven member is released from said driving member.

This invention, in an extremely simple structure as described above, can securely select transmission and nontransmission of the driving force from the driving member to a driven member, by means of the engaging member located between the driving member and driven member.

DESCRIPTION OF THE PREFERRED EMBODIMENTS

The clutch assembly of a first embodiment of this invention is now described below while referring to the accompanying drawings.

Figure 1:
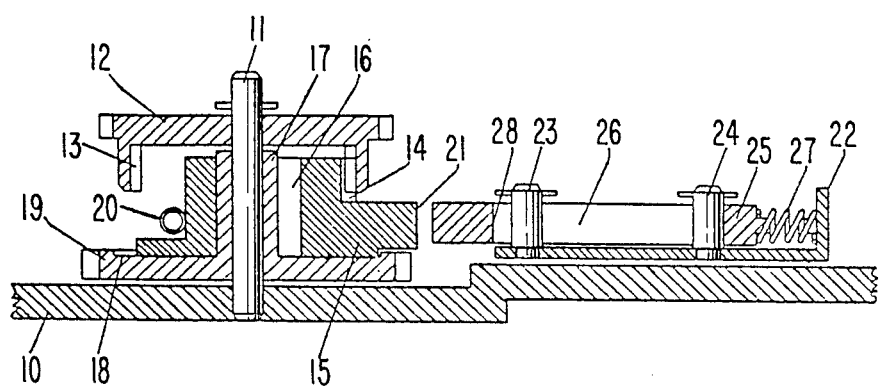
FIG. 1 is a sectional view of essential parts of a clutch assembly according to first embodiment of this invention.

In FIG. 1, a driving gear 12 which is always rotated and driven by a motor (not shown) is rotatably supported on a shaft Il planted on a chassis 10, and projections 13 are disposed at specified intervals on its inner circumference. A driven gear 19 possesses a boss 17 to slidably guide a clutch member or engaging member 15 and a groove 18 to be fitted with the clutch member 15. The boss 17 is engaged with a guide groove 16 disposed on the clutch member 15, the clutch member 15 having a first projection 14 keeping an engaging relation with a projection 13, and the driven gear 19 being; rotatably supported on the shaft 11. The clutch member 15 is thrust in the rightward direction in FIG. 1 by means of a spring or first thrusting member 20 stretched over the driven gear 19, and it is engaged with the projection 13 provided on the driving gear 12. (clutch member 15 is in the "engaged" position.) Therefore, the torque of the driving gear 12 is transmitted to the driven gear 19 by way of the clutch member 15. If, at this time, the clutch member 15 moves in the leftward direction, resisting the thrusting force of the spring 20, the engagement of the first projection 14 and projection 13 is released, and the torque of the driving gear 12 is not transmitted to the driven gear 19. Incidentally, the clutch member 15 also possesses a second projection 21 which abuts against an abutting member described below. A supporting plate or member 22 is designed to move reciprocally on the chassis 10 between the non-acting position shown in FIG. 2 and acting position shown in FIG. 3, by a known means (for example, the driving of a plunger by a solenoid), and also to stop at the acting position shown in FIG. 3. Shafts 23 and 24 are provided on the supporting plate 22 so as to support an abutting member 25 slidably in the lateral direction in FIG. 1, being engaged with a guide groove 26 of the abutting member or releasing member 25. Meanwhile, the abutting member 25 receives a thrusting force in the leftward direction in FIG. 1 by a compression spring 27 placed between it and the supporting plate 22, but it is stopped at the position shown in FIG. 1 as the shaft 24 abuts against the edge of guide groove 26. Here, when the abutting member 25 is moved in the rightward direction in FIG. 1, resisting the thrusting force of the compression spring or second thrusting member 27, a stopping surface 28 abuts against the shaft 23, and it is designed to be stopped at the position shown in FIG. 4. That is, a first abutting portion 29 and a second abutting portion or projection 30 provided at the edge of the abutting member 25 abut against the second projection 21 of the clutch member 15, and the abutting member 25 moves from the position in FIG. 2 rightward to the position shown in FIG. 4, where it is stopped. The first abutting portion is divided into two subportions, and the first abutting portion is located therebetween.

The operation is described hereinafter.

Figure 2:
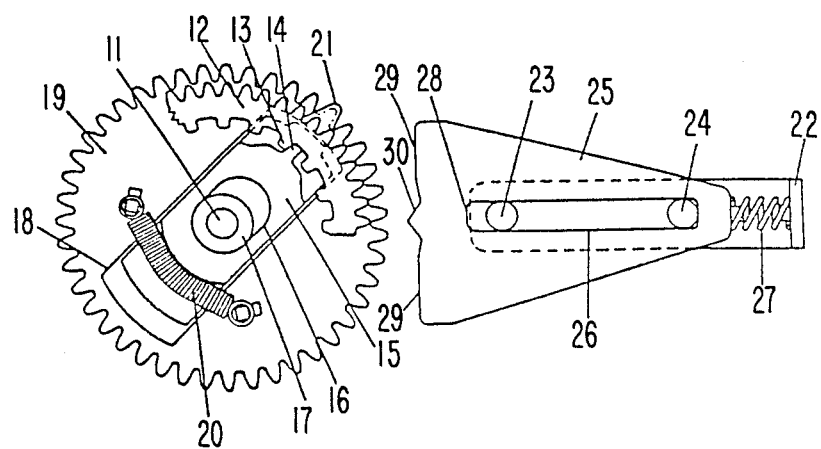
FIG. 2 to FIG. 6 are plan views of the embodiment of FIG. 1.
Figure 3:
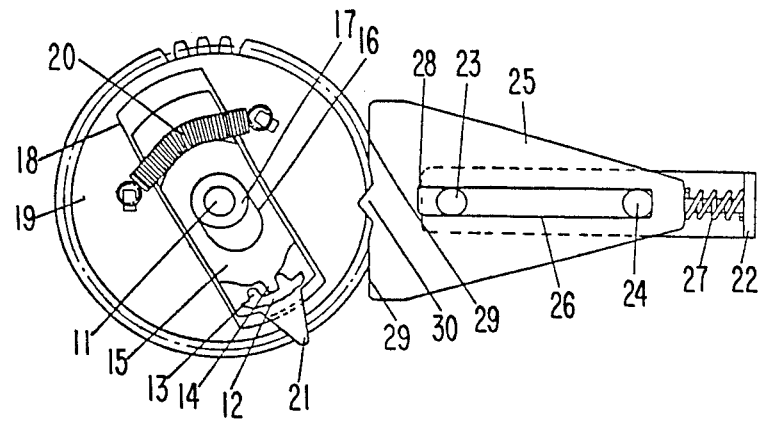

In FIG. 2, the supporting plate 22 is stopped at the non-acting position, and the second projection 21 of clutch member 15 and the abutting member 25 are in a relation not to abut against each other. Therefore, the clutch member 15 is thrust in the upper obliquely rightward direction in FIG. 2, and the first projection 14 and the projection 13 on the driving gear 12 are engaged with each other. For example, when the driving gear 12 is rotated and driven in the clockwise direction by a motor (not shown) in FIG. 2, the clutch member 15 having the first projection 14 engaged with the projection 13 is also rotated and driven in the clockwise direction. Therefore, the motor torque is also transmitted to the driven gear 19, which rotates in the clockwise direction.

Next is explained the operation of not transmitting the torque of driving gear 12 to the driven gear 19. The supporting plate 22 is removed from the non-acting position shown in FIG. 2 to the acting position shown in FIG. 3 by, for example, a solenoid (not shown), and is stopped at the acting position. At this time, the load on the solenoid need only be a small force sufficient to move the supporting plate 22 mounted on the abutting member 25. As a result, the first abutting portion 29 disposed at the edge of the abutting member 25 on the supporting plate 22 and the second projection 21 of the clutch member 15 are ready to abut against each other. When the driving gear 12 is further rotated clockwise from the state shown in FIG. 3, the second projection abuts against the first abutting portion 29. At this time, a load torque T is applied to the driven gear 19. Therefore, supposing the distance from the center of shaft 11 to the contact point of the projection 13 of driving gear 12 and the first projection 14 of clutch member 15 to be R and the tangential force at contact point to be N, the following relation is established:

$$N = T/R \quad (1)$$

And supposing the coefficient of friction at the contact point to be $\mu$, and the frictional force between clutch member 15 and groove 18 to be f', the frictional force f in the sliding direction on the driven gear 19 of clutch member 15 is $$f = \mu \times N + f' = \mu \times T/R + f' \quad (2)$$

Therefore, in the state shown in FIG. 4, the releasing force F to move the clutch member 15 in the direction to be separated from the driving gear 12 is required as defined below, supposing the thrusting force in the engaging direction of clutch member 15 by the spring 20 to be P.

$$F = f + P \quad (3)$$

Figure 4:
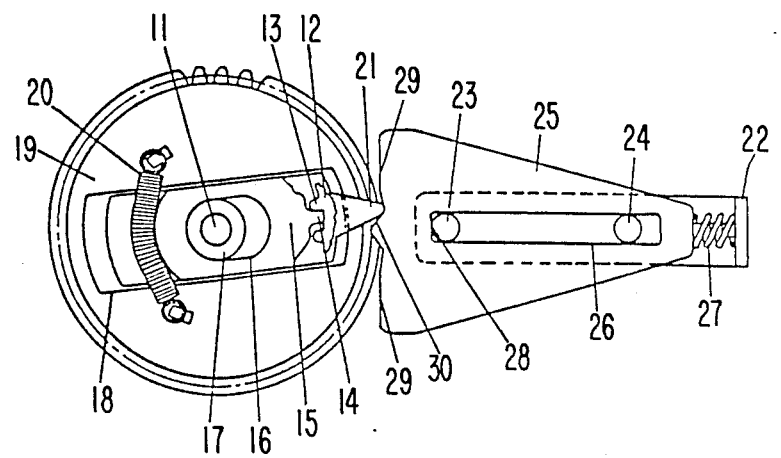
Figure 5:
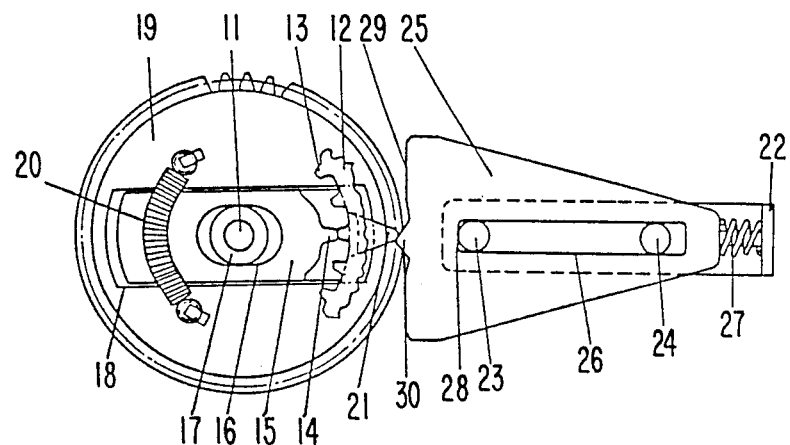
Figure 6:
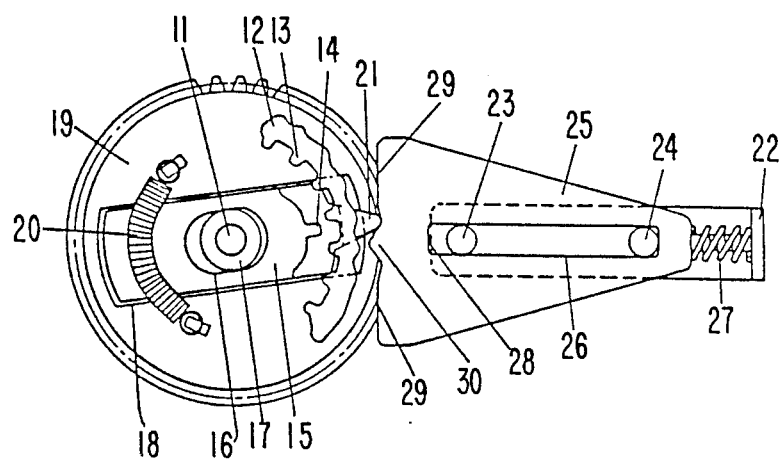

Incidentally, as the thrusting force of the compression spring 27 to thrust the abutting member 25 in the leftward direction in FIG. 4 is set smaller than the releasing force F, if the second projection 21 abuts against the first abutting portion 29, the engagement between the clutch member 15 and driving gear 12 is not disconnected, and the abutting member 25 is moved in the rightward direction, resisting the thrusting force of the compression spring 27. As the driving gear 12 further rotates clockwise, it reaches the state as shown in FIG. 4, and the movement of the abutting member 25 in the rightward direction is stopped because the shaft 23 and stopping surface 28 abut against each other. The driving gear 12 still continues to rotate until the second projection 21 of the clutch member 15 abuts against the second abutting portion 30. At this time, because the rightward movement of the abutting member 25 is restricted by the shaft 23 and stopping surface 28, the clutch member 15 moves in the leftward direction in FIG. 4 along the oblique surface of the second abutting portion 30 of the abutting member 25 until reaching the position shown in FIG. 5, where the engagement of the first projection 14 of the clutch member 15 and the projection 13 of the driving gear 12 is disconnected, and, the torque of the driving gear 12 is not transmitted to the driven gear 19. (clutch member 15 is in the disengaged position). At this time, the frictional force f between the projection 13 and the first projection 14, and the frictional force f' between the clutch member 15 and groove 18 are eliminated, and only the thrusting force by the string, 20 acts on the clutch member 15. However, given that the thrusting force of the spring 20 is set smaller than that of the compression spring 27, the abutting member moves the clutch member 15 in the leftward direction, resisting the thrusting force of the spring 20, as shown in FIG. 6, and the projection 13 of the driving gear 12 and the first projection 14 of the clutch member 15 are completely separated from each other. (clutch member 15 is in the released position). Therefore, if vibration or other force is applied from outside, the clutch member 15 and the driving gear 12 are not engaged unexpectedly, and a secure releasing operation is effected.

Next, when the supporting plate 22 is moved from the nontransmitting state of torque shown in FIG. 6 to the position shown in FIG. 2 by means of a solenoid (not shown), the clutch member 15 moves in the rightward direction in FIG. 6 by the thrusting force of the spring 20 along with the movement of the abutting member 25 until the first projection 14 and the projection 13 are engaged with each other, so that the torque of the driving gear 12 is transmitted to the driven gear 19 by way of the clutch member 15.

As mentioned above, when selecting transmission and nontransmission of the torque of the driving gear 12 to the driven gear 19, because the required force of the solenoid (not shown) to drive the supporting plate 2 is small, the solenoid may be reduced in size for a savings in power consumption. At the same time, the reliability of the operation is enhanced.

Meanwhile, in the above description, the rotation of the driving gear 12 is clockwise, but, needless to say, exactly the same operation and effect are obtained when rotated counterclockwise.

Alternatively, the projection 13 is disposed at the inside of the driving gear 12, but it is not limited to the shown shape, and it is the same if a gear is formed or pin is provided A second embodiment of this invention is hereby described.

Figure 7:
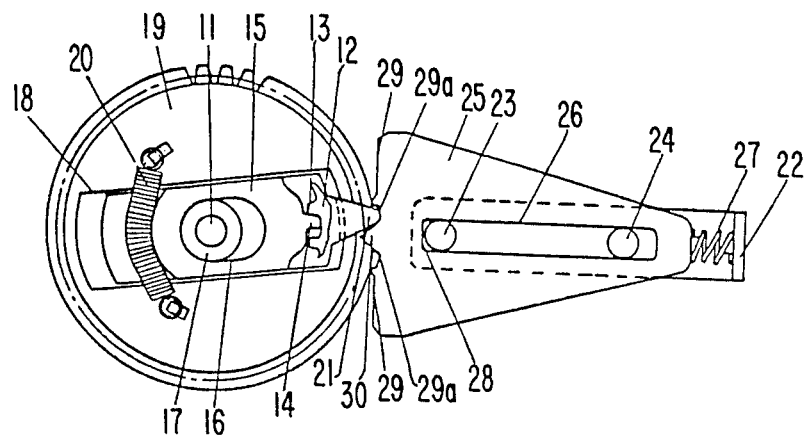
FIG. 7 to FIG. 9 are plan views of a second embodiment of this invention.

What is different from the constitution of the first embodiment is that a first abutting portion 29 and a second abutting portion 30 are disposed in order to move the abutting member 25 in the rightward direction from the position shown in FIG. 7, at the edge of the abutting member 25, by abutting against the second projection 21 of the clutch member 15. In addition, the abutting member 25 is provided with a dent or recess 29a which is engaged with the second projection 21 of the clutch member 15 to restrict the rotation of driven gear 19 often after the engagement of the clutch member 15 and driving gear 12 is released.

The operation of the second embodiment is as follows.

Figure 8:
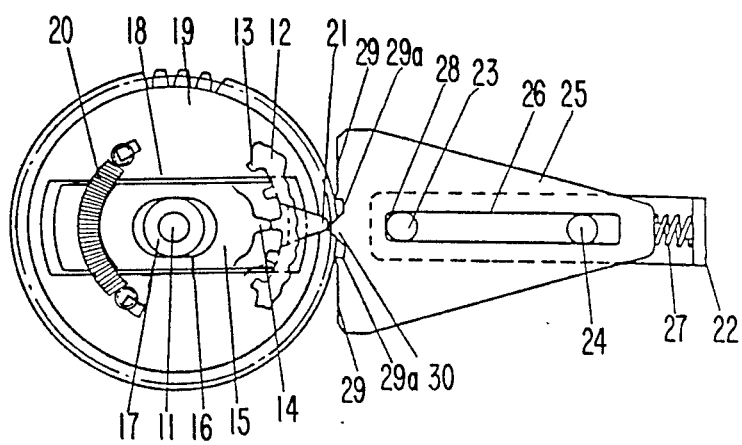
Figure 9:
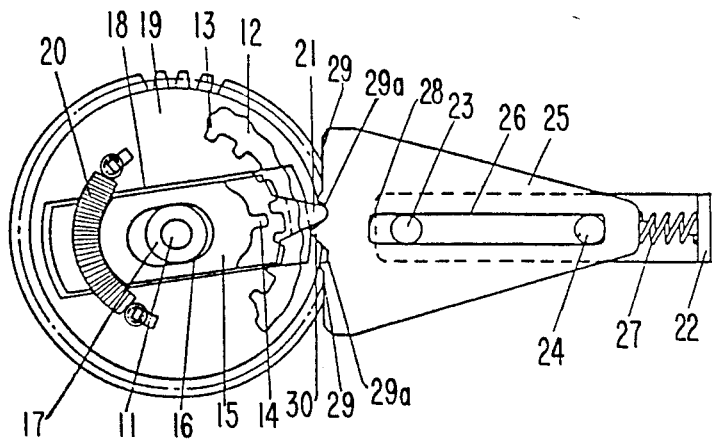

First the action of not transmitting the torque of the driving gear 12 to the driven gear 19 is explained. The supporting plate 22 is moved from the non-acting position to the acting position shown in FIG. 7 by means of a known means (such as solenoid), and it is stopped at this acting position. As a result, the first abutting portion 29 and second abutting portion or projection 30 disposed at the edge of abutting member 25 on the supporting plate 22 and the second projection 21 of the clutch member 15 are ready to abut against each other. Because the thrusting force of the compression spring 27 to thrust the abutting member 25 in the leftward direction in FIG. 7 is set smaller than the releasing force F for separating the engagement of the clutch member 15 and driving gear 12, if the second projection 21 abuts against the first abutting portion 29, the engagement of the clutch member 15 and driving gear 12 is not disconnected, and the abutting member 25 is moved in the rightward direction, resisting the thrusting force of the compression spring 27. The shape from the first abutting portion 29 to the dent 29a of the abutting member 25 is designed in a relation so that the stopping surface 28 may not be stopped by the shaft 23 if the abutting member 25 is moved in the rightward direction owing to abutting of the clutch member 15 against the second projection 21. The driving gear 12 continues to rotate clockwise, and the second projection 21 of the clutch member 15 abuts against the second abutting portion 30. In consequence, the abutting member 25 further moves in the rightward direction, but because the rightward movement of the abutting member 25 is restrict by the abutment of the shaft 23 and stopping surface 28, clutch member 15 moves in the leftward direction in FIG. 7 along the oblique surface of the second abutting portion 30 of the abutting member 25 until reaching the position shown in FIG. 8, where the engagement of the first projection 14 of clutch member 15 and the projection 13 of driving gear 12 is disconnected, so that the torque of the driving gear 12 is not transmitted to the driven gear 19. At this time, the frictional force f between the projection 13 and first projection 14 is eliminated, and only the thrusting force by spring 20 acts on the clutch member 15. However, given that the thrusting force of spring 20 is set smaller than that of compression spring 27, the abutting member 25 overcomes the thrusting force of spring 20 to move the clutch member 15 in the leftward direction to the position shown in FIG. 9 where the projection 13 of the driving gear 12 and the first projection 14 of the clutch member 15 are completely separated from each other. At this time, the second projection 21 of the clutch member 15 is engaged with the dent 29a of the abutting member 25, thereby restricting the rotation in both clockwise direction and counterclockwise direction of the driven gear 19. Therefore, if vibration or other force is applied from outside, the clutch member 15 and driving gear 12 are not unexpectedly engaged with each other, nor the driven gear 19 be rotated, so that secure engaging and disengaging operation is guaranteed.

Incidentally, as the means for restricting the rotation of the driven gear 19 after the driving gear 12 and clutch member 15 are disengaged, the dent 29a is provided in the abutting member 25, but its position and shape are not limited as shown in the drawing.

A third embodiment of this invention is described below while referring to FIG. 10 to FIG. 14.

Figure 10:
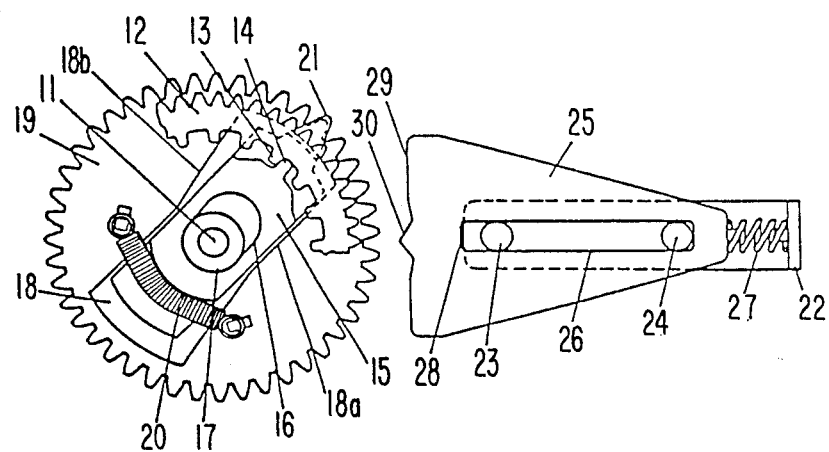
Figure 11:
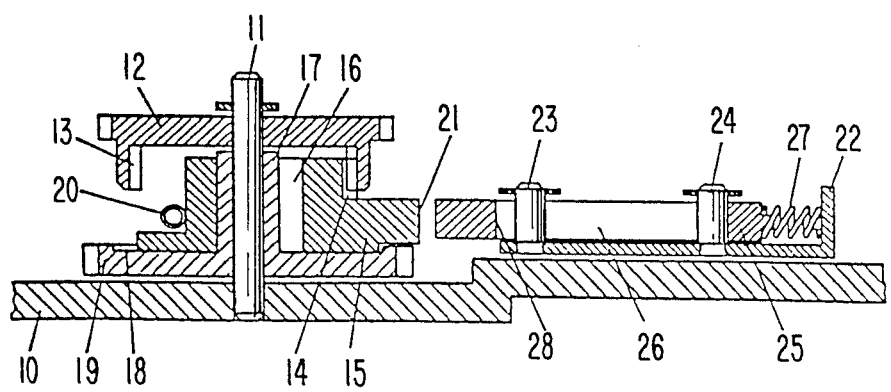
FIG. 11 is a sectional view of essential parts of the embodiment of FIG. 10.

What is different from the first embodiment is that, as shown in FIG. 10, the driven gear 19, possessing a boss 17 to slidably and rotatably guide the clutch member 15 by engaging with a guide groove 16 provided in the clutch 15 having a first projection 14 which is in an engaging relation with a projection 13, has a groove 18 having edge surfaces 18a, 18b for defining an amount of rotation in the clockwise direction and counterclockwise direction in FIG. 10 of the clutch member 15, rotatably supported on the shaft 11. Furthermore, by the spring 20 stretched on the driven gear 19, the clutch member 15 is thrust in the rightward direction in FIG. 11, and is engaged with the projection 13 disposed on the driving gear 12. Therefore, the torque of the driving gear 12 is transmitted to the driven gear 19 by way of the clutch member 15 and edge surface 18a of the groove 18. The operation of this third embodiment is illustrated hereinafter.

If the driving gear 12 is rotated and driven in the clockwise direction by a motor (not shown) in FIG. 10, the clutch member 15 having the first projection 14 engaged with the projection 13 is rotated and driven in the clockwise direction. Therefore, the clutch member 15 is stopped by the edge surface 18a, and the motor torque is also transmitted to the driven gear 19, which is then put into clockwise revolution.

Figure 14:
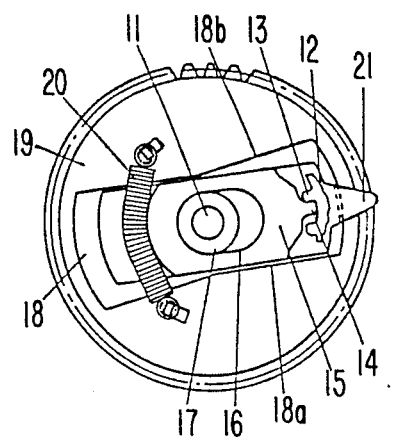
FIG. 10 and FIG. 12 to FIG. 14 are plans views of a clutch assembly of a third embodiment of this invention.
Figure 12:
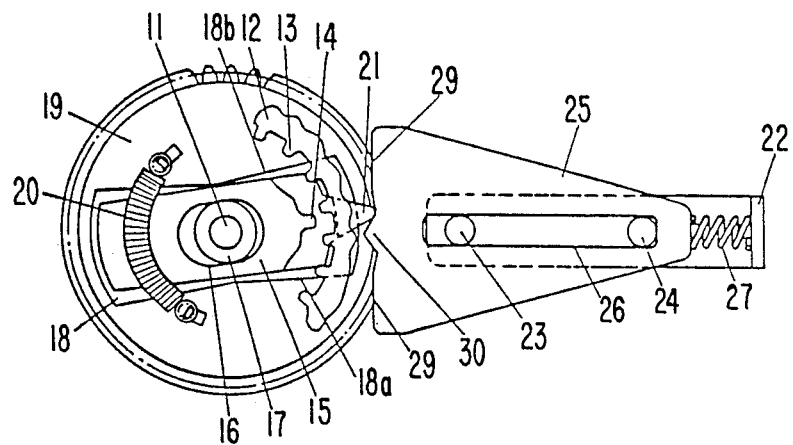
Figure 13:
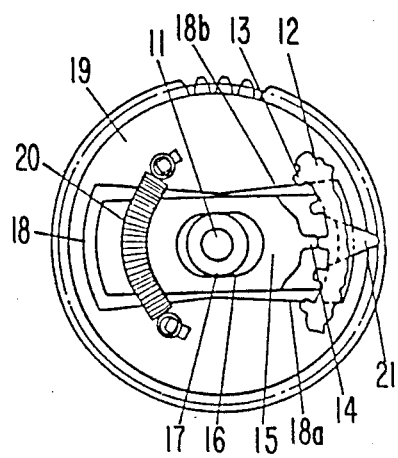

In the next step, when the supporting plate 22 is moved from the torque nontransmitting state shown in FIG. 12 to the position shown in FIG. 10 by a known means (such as solenoid), the clutch member 15 is moved in the rightward direction in FIG. 12 by the thrusting force of the spring 20 along with the movement of the abutting member 25 until the first projection 14 and the projection 13 are engaged with each other, so that the torque of the driving gear 12 is transmitted to the driven gear 15 through the clutch member 15. At this time, the clutch member 15 has a degree of freedom in the rotating direction, and, as shown in FIG. 13, if the first projection 13 abuts against the front ends of the projection 13, the clutch member 15 escapes by turning in the rotating direction of the driving gear 12, and is securely engaged with the adjacent projection as shown in FIG. 14. Therefore, only a very slight portion of the front end is engaged depending on the timing, and there is no problem for strength.

In this explanation, the rotation of driving gear 12 is clockwise, but if rotated counterclockwise, only the clutch member 15 is stopped by the edge surface of groove 18b, and all other operations and effects are exactly the same.

A fourth embodiment of this invention is described below in conjunction with FIG. 15 to FIG. 20.

In the drawings, a driving gear 12 which is always rotated and driven by a motor (not shown) is rotatably supported on a shaft 11 planted on a chassis 10, and projections 13 are formed at specified intervals on the inside of driving gear 12. A driven gear 19 possessing a boss 17 to slidably guide a clutch member 15 by engaging with a guide groove 16 provided in the clutch member 15 having a first projection 14 which is in an engaging relation with a projection 13, and a groove 18 which is fitted with the clutch member 15 is rotatably supported on the shaft 11. Furthermore, by having the spring 20 stretch over the driven gear 19, the clutch member 15 is thrust in the rightward direction in FIG. 16, and it is engaged with the projection 13 disposed on the driving gear 12. Therefore, the torque of the driving gear 12 is transmitted to the driven gear 19 through the clutch member 15. Here, if the clutch member 15 moves in the leftward direction in FIG. 16, overcoming the thrusting force of the spring 20, the engagement of the first projection 14 and the projection 13 is released, and it is so designed that the torque of the driving gear 12 is not be transmitted to the driven gear 19. Incidentally, the clutch member 15 also possesses a second projection 21 which abuts against an abutting member 25 discussed below. On the outside of the driven gear 19 is provided a cam surface 32 on both sides of and in the vicinity of the second projection 21 of the clutch member 15. When abutting against the abutting member 25, the abutting member 25 is once moved in the rightward direction in FIG. 17 until the abutting relation between the cam surface 32 and abutting member 25 is disengaged, and the abutting member 25 is shaped so as to be able to press down the second projection 21 of the clutch member 15. The supporting plate 22 moves reciprocally between the non-acting position shown in FIG. 15 and the acting position shown in FIG. 17 to FIG. 20, on the chassis 10, by a known means (for example, driving of a plunger by a solenoid, and is designed to be stopped at the position shown in FIG. 15 and FIG. 17. The supporting plate 22 has shafts 23, 24 planted thereon, which support the abutting member 25 slidably in the lateral direction in FIG. 15 as being engaged with the guide groove 26 in the abutting member 25. Meanwhile, the abutting member 25 receives a thrusting force in the leftward direction in FIG. 15 by the compression spring 27 loaded between it and the supporting plate 22. However, given that the shaft 24 abuts against the edge of the guide groove 26, the abutting member 25 is stopped at the position shown in FIG. 15.

The operation of this embodiment is as follows.

Figure 15:
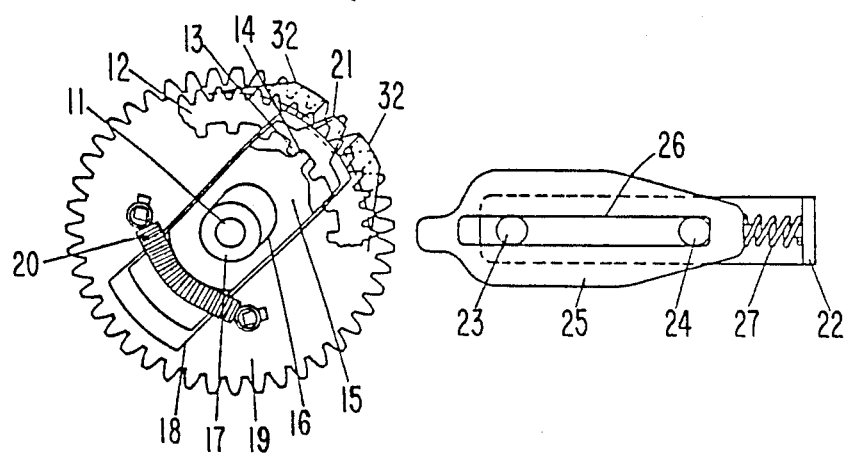
FIG. 15 and FIG. 17 to FIG. 20 are plan view of a clutch assembly of a fourth embodiment of this invention.
Figure 16:
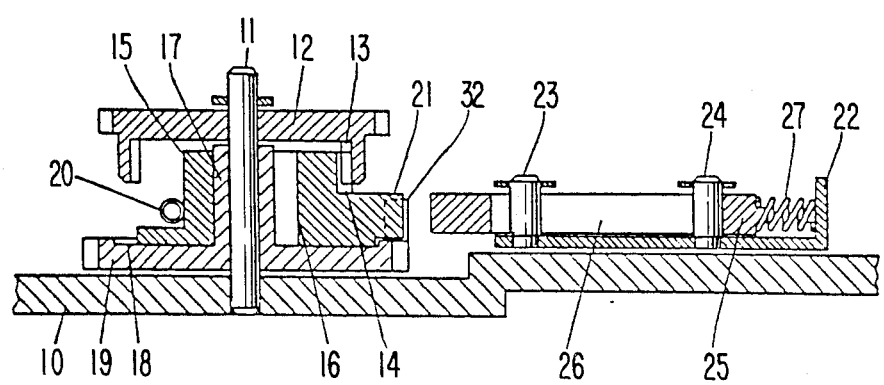
FIG. 16 is a sectional view of essential parts of the embodiment of FIG. 15.
Figure 17:
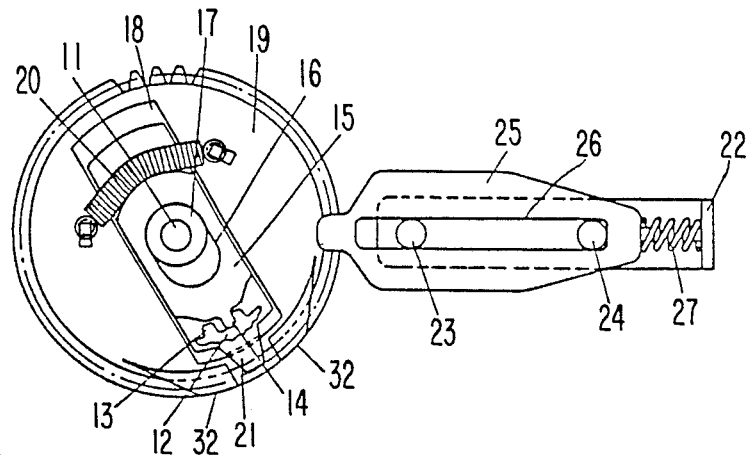

In FIG. 15, the supporting plate 22 is stopped at a non-acting position, in which the second projection 21 of clutch member 15 and abutting member 25 are in a non-abutting relation. Therefore, the clutch member 15 is thrust in the obliquely right upward direction in FIG. 15 by the spring 20, and the first projection 14 and the projection 13 disposed on the driving gear 12 are engaged with each other. For example, if the driving gear 12 is rotated and driven in the clockwise direction in FIG. 15 by a motor (not shown), the clutch member 15 having the first projection 14 which is engaged with the projection 13 is also rotated and driven in the clockwise direction. Therefore, the motor torque is also transmitted to the driven gear 19, which also rotates in the clockwise direction.

Figure 18:
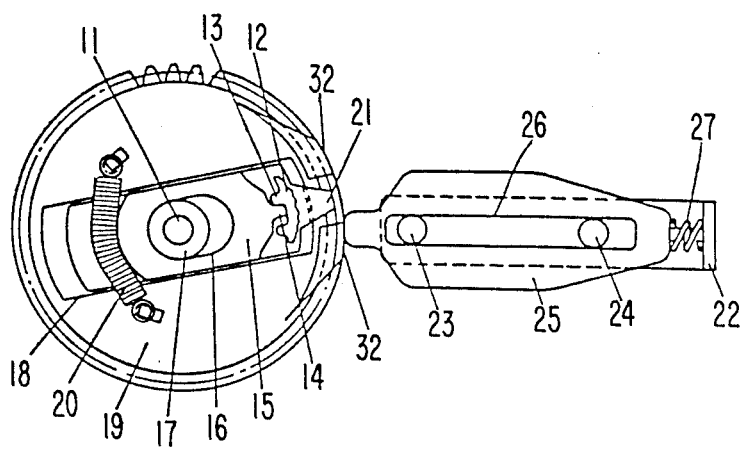
Figure 19:
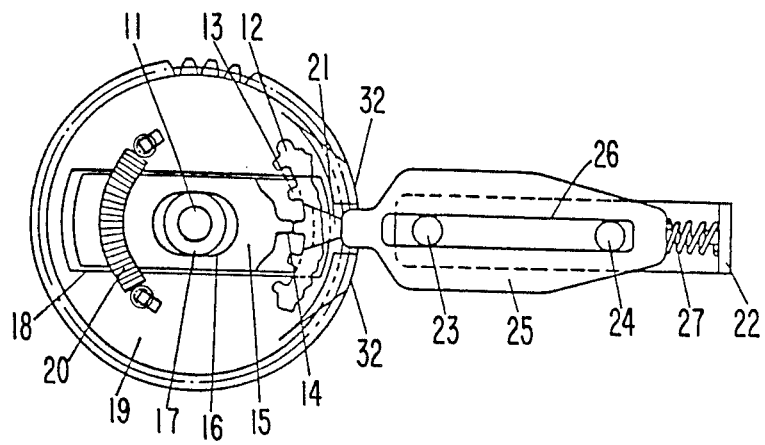

The operation of not transmitting the torque of driving gear 12 to driven gear 19 is described below. The supporting plate 22 is moved by a known means (such as solenoid) from the non-acting position shown in FIG. 15 to the acting position shown in FIG. 17, and is stopped at this acting position. As a result, the abutting member 25 on the supporting plate 22 and the cam surface 32 are ready to abut against each other. When the driving gear 12 is rotated clockwise in the state shown in FIG. 17, the cam surface 32 and abutting member 25 abut against each other, and the abutting member 25 once moves in the rightward direction, overcoming the thrusting force of the compression spring 27, as shown in FIG. 18. As the driving gear 12 moves further clockwise, it comes to the recess in the cam surface 32, and the second projection 21 abuts against abutting member 25. At this time, a load torque T is applied to the driven gear 19. Therefore, supposing the distance from the center of shaft 11 to the contact point of the projection 13 of driving gear 12 and the first projection 14 of clutch member 15 to be R and the tangential force at contact point to be N, it follows that:

$$N = T/R \tag{4}$$

Furthermore, assuming the coefficient of friction at the contact point to be $\mu$, and the frictional force acting between the clutch member 15 and groove 18 to be f', the frictional force f in the sliding direction on the driven gear 19 of the clutch member 15 is expressed as follows:

$$f = \mu \times N + f' = \mu \times T/R + f' \tag{5}$$

Hence, the, required releasing force F to move the clutch member 15 in the direction to be separated from the driving gear 12 in the state shown in FIG. 18 is, assuming the thrusting force in the engaging direction of the clutch member 15 by the spring 20 to be P, as defined below:

$$F = f + P \tag{6}$$

Incidentally, given that the thrusting force of the compression spring 27 to thrust the abutting member 25 in the leftward direction in FIG. 18 is set larger than said releasing force F, when the second projection 21 abuts against the abutting member 25, the clutch member 15 moves in the leftward direction in FIG. 18, and the engagement of the clutch member 15 and driving gear 12 is disconnected. That is, when the driving gear 12 further rotates clockwise from the position shown in FIG. 18, the second projection 21 of the clutch member 15 abuts against the abutting member 25, and, as mentioned above, because the thrusting force of the compression spring 27 is set sufficiently larger than the force F, the abutting member 25 causes the clutch member 15 to move in the leftward direction until reaching the position shown in FIG. 19, where the engagement of the first projection of clutch member 15 and the projection 13 of driving gear 12 is disconnected, so that the torque of the driving gear 12 is not transmitted to the driven gear 19. Furthermore, the clutch member 15 is moved in the leftward direction up to the position shown in FIG. 20, and the projection 13 of driving gear 12 and the first projection 14 of clutch member 15 are completely isolated from each other. Here, the thrusting force of the compression spring 27 acts on the driven gear 19 only while transferring to the nontransmitting state as the driven gear 19 and the abutting member 25 abut against each other, and in the stationary state of transmission of rotation, no effect is exerted on the rotation of driving gear 12 and driven gear 19. On the other hand, the front edge of the abutting member 25 is fitted with the gap in two cam surfaces 32 so as to restrict the rotation of the driven gear 19 in both clockwise and counterclockwise direction. Therefore, if vibration or other force is applied from outside, the clutch member 15 and driving gear 12 will not be unexpectedly engaged with each other, nor the driven gear 19 be put in revolution, so that a secure engaging and disengaging operation may be guaranteed.

According to this embodiment, as stated above, it is possible to change over securely to the nontransmitting state whether the transmission torque from the driving gear 12 to the driven gear 19 is small or large.

Figure 20:
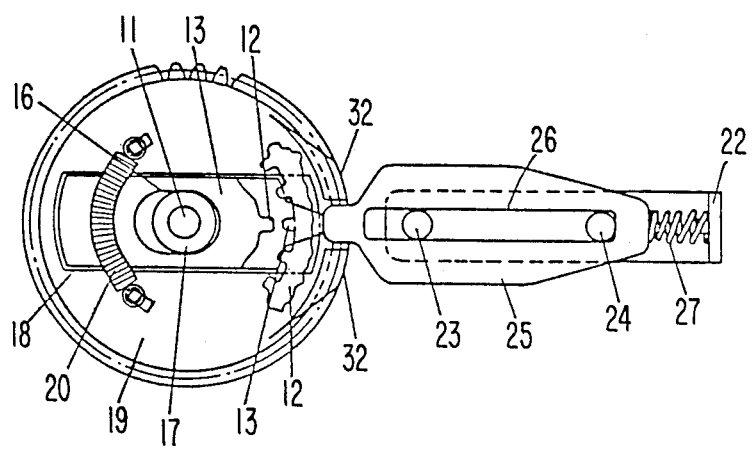

Next, from the state of not transmitting the, torque shown in FIG. 20, when the supporting plate 22 is moved rightwardly to the position shown in FIG. 15 by a known means (for example, a solenoid), the clutch member 15 moves in the rightward direction in FIG. 20 by the thrusting force of the spring 20 along with the movement of the abutting member 25 until the first projection 14 and projection 13 are engaged with each other, so that the torque of the driving gear 12 is transmitted to the driven gear 19 by way of the clutch member 15.

Incidentally, in this explanation, the rotation of the driving gear 12 is clockwise, but this embodiment is so constituted that similar operation and effect can be obtained if rotated counterclockwise.

Or, the cam surface 32 is provided as the abutting portion for moving the abutting member 25 once in the rightward direction before the clutch member 15 abuts against the abutting member 25, but its shape is not limited to the one ,shown in the drawing, and a pin or the like may be provided instead.

Also, the projection 13 disposed on the inside wall of the driving gear 12 is not limited to the shape shown in the, drawing, but a gear may be formed, or a pin may be provided instead.

Hereinafter is described a fifth embodiment of this invention while referring to FIG. 21 to FIG. 26.

Figure 21:
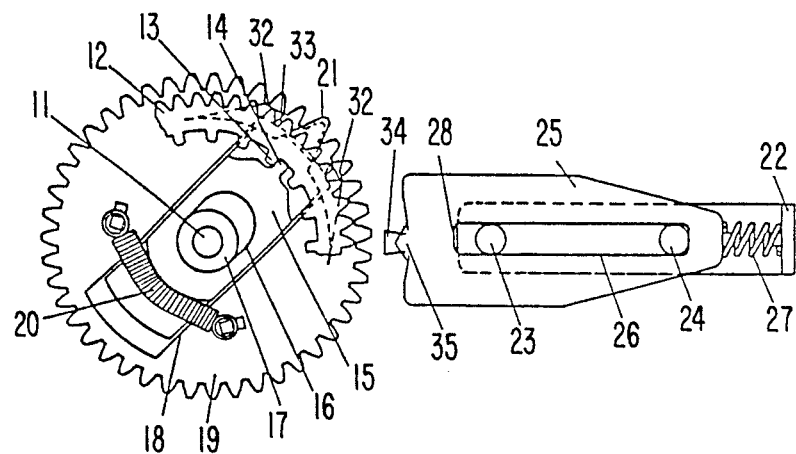
FIG. 21, and FIG. 23 to FIG. 26 are plan views of a clutch assembly of a fifth embodiment of this invention.
Figure 22:
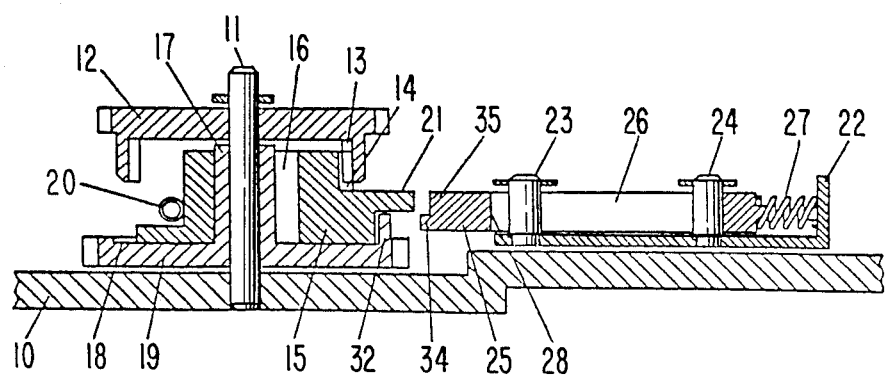
FIG. 22 is a sectional view of essential parts of the embodiment of FIG. 21.
Figure 23:
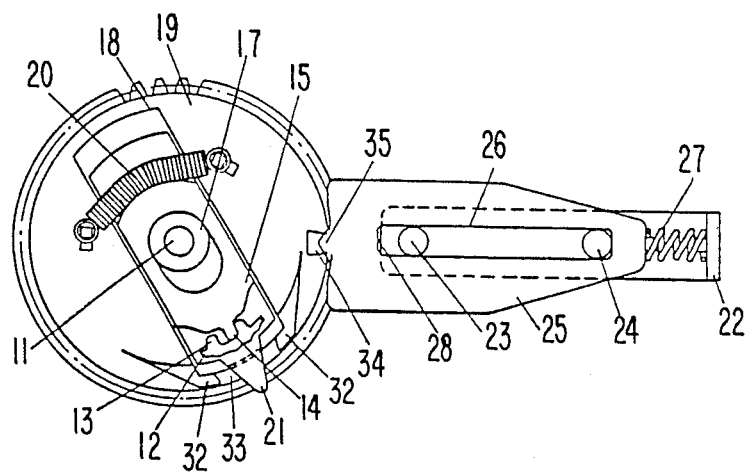

In FIG. 21, a driving gear 12 which is always rotated and driven by a motor (not shown) is rotatably supported on a shaft 11 planted on a chassis 10, and projections 13 are disposed at specified interval on its inner circumference. The shaft also rotatably supports a boss 17 which slidably guides a clutch member 15 by engaging with a guide groove 16 provided in the clutch member 15 possessing a first projection 14 in an engaging relation with the projection 13, and a driven gear 19 which possesses a groove 18 to be fitted with the clutch member 15. By a spring 20 stretched above the driven gear 19, the clutch member 15 is thrust in the rightward direction in FIG. 22, and is engaged with the projection 13 provided on the driving gear 12. Therefore, the torque of the driving gear 12 is transmitted to the driven gear 19 by way of the clutch member 15. If this clutch member 15 moves in the leftward direction in FIG. 22, resisting the thrusting force of the spring 20, the engagement of the first projection 14 and the projection 13 is released, and the torque of the driving gear 12 is not transmitted to the driven gear 19. The clutch member also possesses a second projection 21 which abuts against an abutting member 25. On the outer circumference of the driven gear 19, there is a cam surface 32 which possesses a recess 33 which is narrower in width toward the thrusting direction of the clutch member, at both sides in the vicinity of the second projection 21 of the clutch member 15, and because it abuts against the abutting member 25, the abutting member 25 is moved once in the rightward direction in FIG. 23, and the abutting relation of the cam surface 32 and abutting member 25 is cleared, so that the abutting member 25 may press down the second projection 21 of the clutch member 15. A supporting plate 22 moves reciprocally between the non-acting position shown in FIG. 21 and the acting position shown in FIG. 23, on the chassis 10 by means of a known means (for example, driving of plunger by solenoid), and is designed to be stopped at the acting position shown in FIG. 21 and FIG. 23. Shafts 23, 24 are planted on the supporting plate 22, and they slidably support the abutting member 25 in the lateral direction in FIG. 21 by engaging with a guide groove 26 in the abutting member 25. Incidentally, the abutting member 25 receives a thrusting force in the leftward direction in FIG. 21 by a compression spring 27 located between it and the supporting plate 22, but given that the guide 24 abuts against the edge of the guide groove 26, the abutting member 25 is stopped at the position shown in FIG. 21. Here, when the abutting member 25 is moved in the rightward direction in FIG. 23, overcoming the thrusting force of the compression spring 27, a stopping surface 28 abuts against the shaft 23, so that it may be stopped at the position shown in FIG. 25. Furthermore, at the edge of the abutting member 25, there are a first abutting portion 34 which has a wider width toward the thrusting direction of the abutting member 25 and a second abutting portion 35 which can abut against the second projection 21, so as to move the abutting member 25 in the rightward direction in FIG. 23 while abutting against the cam surface 32.

Its operation is as follows.

In FIG. 21, the supporting plate 22 is stopped at the non-acting position, in which the cam surface 32 and the first abutting portion 34 are in a non-abutting relation. Therefore, the clutch member 15 is thrust in the obliquely right upward direction in FIG. 21 by the spring 20, and the first projection 14 and the projection 13 disposed on the driving gear 12 are engaged with each other. For example, if the driving gear 12 is rotated and driven in the clockwise direction by a motor (not shown) in FIG. 21, the clutch member 15 having the first projection 14 which is engaged with the projection 13 is also rotated and driven in the clockwise direction. Therefore, the motor torque is also transmitted to the driven gear 19, so that the driven gear 19 is rotated in the clockwise direction.

Figure 24:
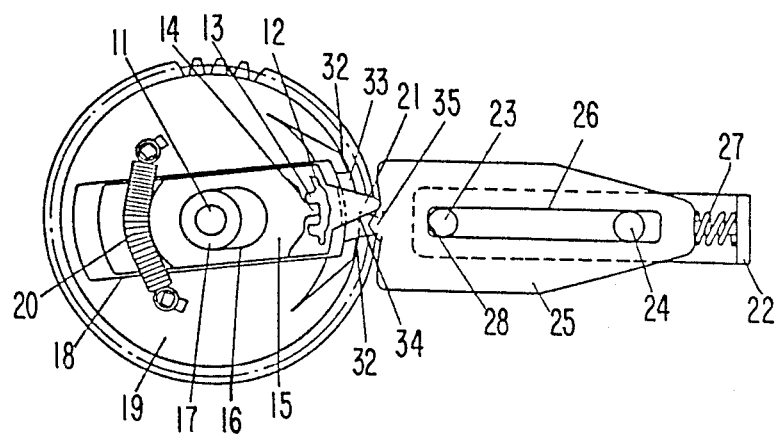

The operation of not transmitting the torque of the driving gear 12 to the driven gear 19 is described below. The supporting plate 22 is moved from the non-acting position shown in FIG. 21 to the acting position shown in FIG. 23 by a known means (such as solenoid), and is stopped at this acting position. As a result, the first abutting portion 34 of the abutting member 25 on the supporting plate 22 and the cam surface 32 of the driven gear 19 are ready to abut against each other. When the driving gear 12 is rotated clockwise from the state shown in FIG. 23, the cam surface 32 and the first abutting portion 34 abut against each other, and the abutting member 25 is moved in the rightward direction, resisting the thrusting force of the compression spring 27. Furthermore, when the driving gear 12 rotates clockwise, the first abutting portion 34 comes to the recess 33 as shown in FIG. 24, so that the second abutting portion 35 and the second projection 21 are ready to abut against each other. At this time, a load torque T is acting on the driven gear 19. Therefore, supposing the distance from the center of the shaft 11 to the contact point of the projection 13 of driving gear 12 and the first projection 14 of clutch member 15 to be R and the tangential force at the contact point to be N, the following relation is established.

$$N = T/R \tag{7}$$

Moreover, assuming the coefficient of friction at the contact point to be $\mu$, and the frictional force acting between the clutch member 15 and groove 18 to be f', the frictional force f of the clutch member 15 in the sliding direction on the driven gear 19 is expressed as follows:

$$f = \mu \times N + f' = \mu \times T/R + f' \tag{8}$$

Therefore, in the state shown in FIG. 24, the releasing force F required to move the clutch member 15 in the direction to be disengaged from the driving gear 12 is, assuming the thrusting force in the engaging direction of the clutch member 15 by the spring 20 to be p, defined the sum:

$$F = f + P \tag{9}$$

Figure 25:
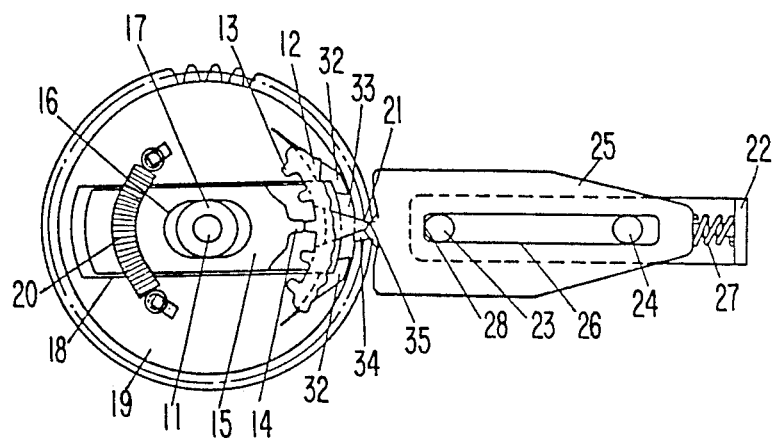

At this time, given that the thrusting force of the compression spring 27 thrusting the abutting member 25 in the leftward direction in FIG. 24 is set smaller than the releasing force F and is larger than the thrusting force P of the spring 20, when the second projection 21 abuts against the second abutting portion 35, the abutting member 25 moves in the rightward direction in FIG. 24, but its movement is defined by the shaft 23 and stopping surface 28. Therefore, when the driving gear 12 further rotates in the clockwise direction in FIG. 24, the clutch member 15 moves in the leftward direction toward the slope of the second abutting portion 35, and the engagement between the projection 13 and the first projection 14 is disconnected as shown in FIG. 25, and the torque of the driving gear 12 is not transmitted to the driven gear 19. After the disengagement between the projection 13 and the first projection 14, the clutch member 15 is further moved in the leftward direction up to the position shown in FIG. 26 by the thrusting force of the compression spring 27, resisting the thrusting force of the spring 20, until the projection 13 of the driving gear 12 is completely isolated from the first projection 14 of the clutch member 15.

Or if the load T fluctuates and becomes, for example, smaller than the set value, the clutch member 15 may be moved in the releasing direction only by the thrusting force of the compression spring 27, and if the load T increases, since the rightward movement of the abutting member 25 is restricted by the shaft 23 and the stopping surface 28, the clutch member 15 can be securely moved in the releasing direction. Thus, if the load T fluctuates, a highly reliable operation is guaranteed.

Here, the thrusting force of the compression spring 27 acts on the driven gear 19 only while transferring to the nontransmitting state as the driven gear 19 abuts against the abutting member 25, and in the stationary state of transmitting rotation, it exerts no effect on the rotation of the driving gear 12 or driven gear 19.

On the other hand, the first abutting portion 34 of the abutting member 25 is fitted to the recess 33 in the two cam surfaces 32 in order to restrict the rotation of the driven gear 19 in the clockwise and counterclockwise direction. Therefore, if vibration or other force is applied from the outside, the clutch member 15 and driving gear 12 will not be engaged unexpectedly with each other, nor the driven gear 19 be rotated a great amount, so that a secure disengaging operation may be effected.

In addition, given that the recess 33 and the first abutting portion 34 are shaped as shown in the drawing, the first abutting portion 34 instantly drops into the recess 33, so that a sharp disengaging operation may be obtained.

As stated above, because of the provision of the first abutting portion 34 to abut against the cam surface 32 and the second abutting portion 35 to press down the second, projection 21 are provided the shape suited to a particular action may be freely set, and measures against abrasion can be effected individually, so that a clutch assembly of higher reliability may be obtained.

Figure 26:
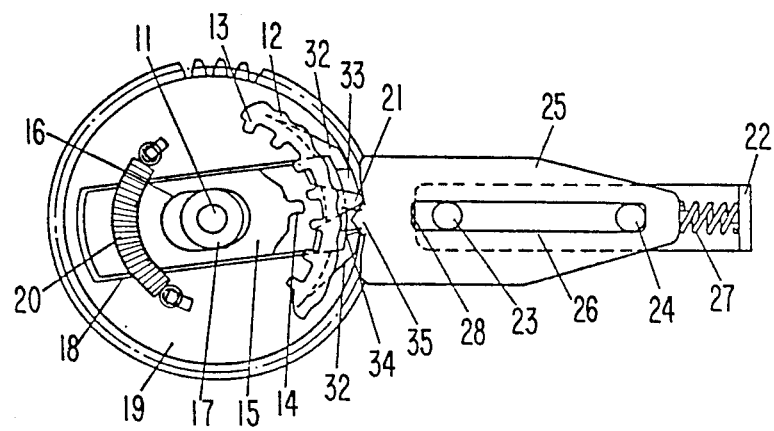

Next, when the supporting plate 22 is moved from the torque nontransmitting state shown in FIG. 26 up to the position shown in FIG. 21 by a known means (such as solenoid), the clutch member 15 moves in the rightward direction in FIG. 26 by the thrusting force of the spring 20 along with the movement of the abutting member 25 until the first projection 14 is engaged with the projection 13, so that the torque of the driving gear 12 is transmitted to the driven gear 19 through the clutch member 15.

In this explanation, meanwhile, the rotation of the driving gear 12 is clockwise, but it is so constituted as to obtain the same operation and effect if rotated in the counterclockwise.

Incidentally, the cam surface 32 is provided as an abutting portion for moving the abutting member 25 once in the rightward direction before the clutch member 15 and the abutting member 25 abut against each other, but its shape is not limited to the one shown in the drawing, and a pin or the like may be planted instead.

Besides, the projection 13 provided inside the driving gear 12 need not be limited to the shape shown in the drawing, and a gear may be formed or a pin may be provided, instead.

A sixth embodiment of this invention is now described in relation to FIG. 27 to FIG. 32.

Figure 27:
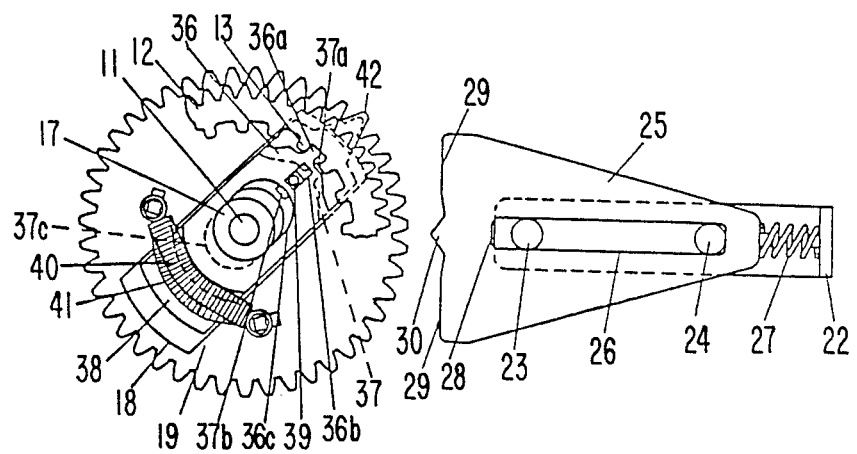
FIG. 27, and FIG. 29 to FIG. 32 are plan views of a clutch assembly of a sixth embodiment of this invention.
Figure 28:
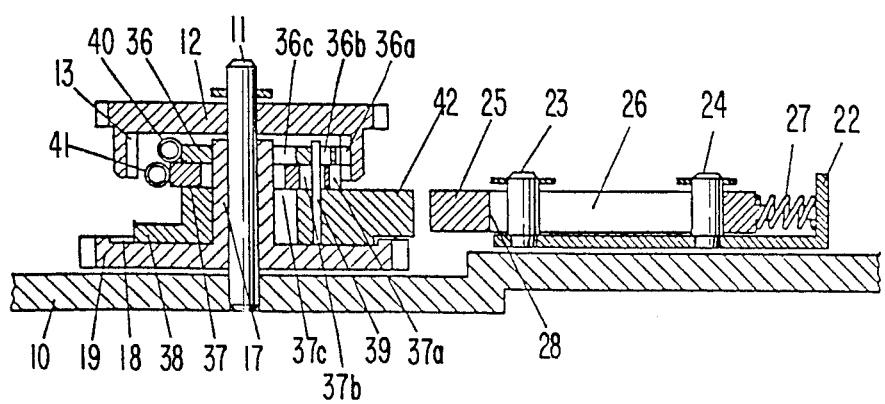
FIG. 28 is a sectional view of essential parts of the same embodiment of FIG. 27.
Figure 29:
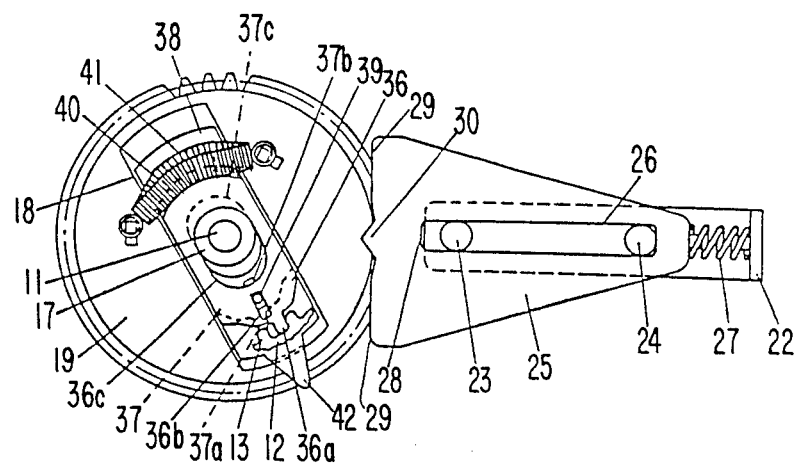

In the drawing, a driving gear 12 which is always rotated and driven by a motor (not shown) is rotatably supported on a shaft 11 planted on a chassis 10, and a projection 13 is provided in its inside at a specified interval. Engaging members 36, 37 possessing projections 36a, 37a which can be individually engaged with the projection 13 are slidably supported by slots 36b, 37b which are engaged with pins 39 planted on a supporting member 38 slidably guided being fitted with a groove 18 and a boss 17 provided in a driven gear 19, and guide holes 36c, 37c engages with the boss 17. The driven gear 19 is rotatably supported on the shaft 11. By springs 40, 41 stretched over the driven gear 19, the engaging members 36, 37 are respectively thrust in the rightward direction in FIG. 28, and the relative positions of the projections 36a, 37a are set about half the pitch interval of the projection 13 as shown in FIG. 27, so that either one of the pair of engaging members 36, 37 may be engaged with the projection 13. FIG. 27 shows the state of engagement of the projection 36a with the projection 13. Therefore, the torque of the driving gear 12 is transmitted to the driven gear 19 by way of the engaging member 36, pin 39, supporting member 38 and groove 18. When the supporting member 38 moves in the leftward direction, the engaging members 36, 37 are also driven in the leftward direction, overcoming the thrusting force of the springs 40, 41, by the pin 39, and the engagement of the projection 36a or 37a with the projection 13 is cleared, and the torque of the driving gear 12 is not transmitted to the driven gear 19. The supporting member 38 has a projection 42 which abuts against the abutting member 25. The supporting plate 22 moves reciprocally between the non-acting position shown in FIG. 27 and the acting position shown in FIG. 29, on the chassis 10 by a known means (for example, driving of plunger by solenoid), and is also designed to be stopped at the acting position shown in FIG. 29. Shafts 23, 24 are planted on the supporting plate 22, and they support the abutting member 25 in the lateral direction in FIG. 27 as being engaged with the guide groove 26 of the abutting member 25. Incidentally, the abutting member 25 receives a thrusting force in the leftward direction in FIG. 27 by the compression spring 27 located between it and the supporting plate 22, but because the shaft 24 abuts against the edge of the guide groove 26, the abutting member 25 is stopped at the position shown in FIG. 27. Here, if the abutting member 25 is moved in the rightward direction in FIG. 27, resisting the thrusting force of the compression spring 27, the stopping surface 28 abuts against the shaft 23, thereby stopping at the position shown in FIG. 30. That is, the first abutting portion 29 and the second abutting portion 30 provided at the edge of the abutting member 25 and the projection 42 of the supporting member 38 abut against each other, and the abutting member 25 moves from the position shown in FIG. 29 up to the position shown in FIG. 30 in the rightward direction, and is stopped there.

Its operation is as follows.

In FIG. 27, the supporting plate 22 is stopped at the non-acting position, in which the projection 42 of the supporting member 38 and the abutting member 25 are not in abutting relation. Therefore, the engaging members 36, 37 are thrust in an obliquely right upward direction in FIG. 27 by the springs 40, 41 and the projection 36a and the projection 13 provided on the driving gear 12 are engaged with each other. For example, when the driving gear 12 is rotated and driven in the clockwise direction by a motor (not shown) in FIG. 31, the engaging member 36 having the projection 36a engaged with the projection 13 is also rotated and driven clockwise. Therefore, the motor torque is also transmitted to the driven gear 19, and the driven gear 19 rotates clockwise.

In contrast, the operation of not transmitting the torque of the driving gear 12 to the driven gear 19 is as follows. The supporting plate 22 is moved from the nonacting position shown in FIG. 27 to the acting position shown in FIG. 29 by a known means (such as solenoid), and is stopped at this acting position. As a result, the first abutting portion 29 disposed at the edge of the abutting member 25 on the supporting plate 22 and the projection 42 of the supporting member 38 are ready to abut against each other. When the driving gear 12 is further rotated clockwise from the state shown in FIG. 29, the projection 42 abuts against the first abutting portion 29. At this time, a load torque T is applied to the driven gear 19. Therefore, supposing the distance from the center of shaft 11 to the contact point of the projection 13 of driving gear 12 and the projection 36a of engaging member 36 to be R, and the tangential force at the contact point to be N, the following relation is established.

$$N = T/R \tag{10}$$

Furthermore, supposing the coefficient of friction at the contact point to be $\mu$, and the frictional force acting between the supporting member 38 and the groove 18 to be f', the frictional force f in the sliding direction of the supporting member 38 on the driven gear 19 is as follows:

$$f = \mu \times N + f' = \mu \times T/R + f' \tag{11}$$

Figure 30:
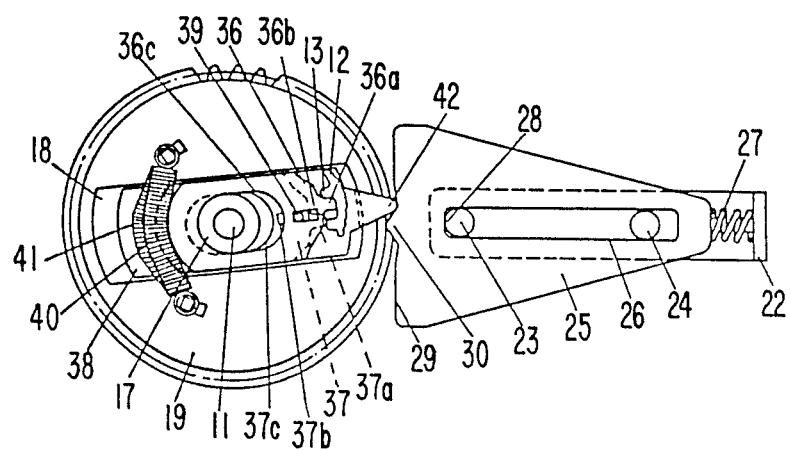
Figure 31:
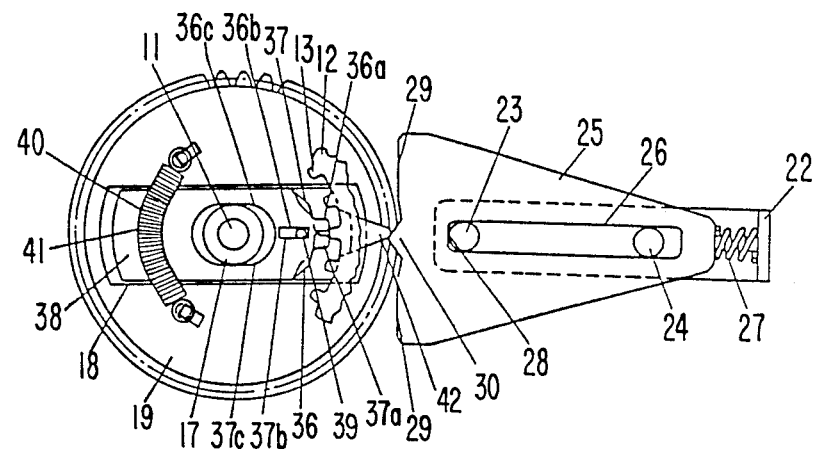

Therefore, the required releasing force F to move the supporting member 38 in the direction to be isolated from the driving gear 12 in the state shown in FIG. 30 is, assuming the thrusting force in the engaging direction of the engaging members 36, 37 by the springs 40, 41 to be P, as follows:

$$F = f + P. \tag{12}$$

Figure 32:
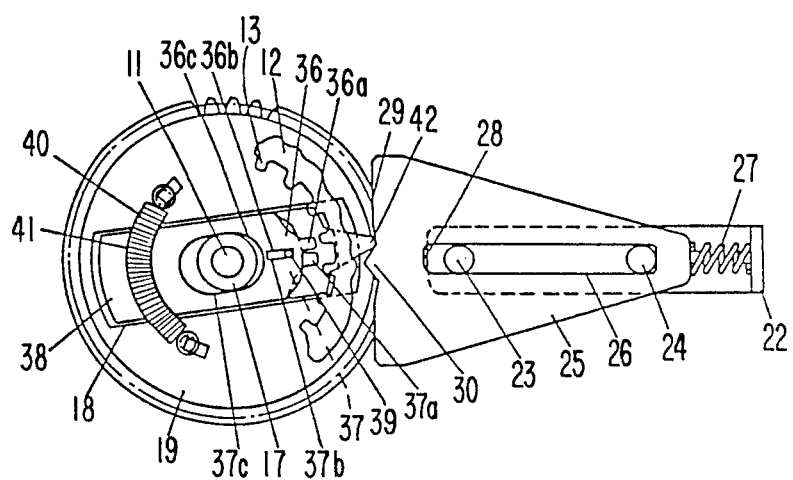

Here, given that the thrusting force of the compression spring 27 to thrust the abutting member 25 in the leftward direction in FIG. 30 is set smaller than the releasing force F, if the projection 42 abuts against the first abutting portion 29, the engagement between the engaging member 36a and driving gear 12 is not disconnected, and the abutting member 25 is moved in the rightward direction, resisting the thrusting force of the compression spring 27. When the driving gear 12 further rotates clockwise, the state becomes as shown in FIG. 30, and the rightward movement of the abutting member 25 is stopped by the abutment of the shaft 23 and stopping surface 28. The driving gear 12 still continues to rotate clockwise until the projection 42 of the supporting member 38 comes to abut against the second abutting portion 30. At this time, because the rightward movement of the abutting member 25 is restricted by the shaft 23 and stopping surface 28, and supporting member 38 moves in the leftward direction in FIG. 30 along the slope of the second abutting portion 30 of the abutting member 25, engaging member 36 is moved in the leftward direction through the pin 39. Arriving at the position shown in FIG. 31, the engagement of the projections 36a, 37a of the engaging members 36, 37 and the projection 13 of the driving gear 12 is cleared, and the torque of the driving gear 12 is not transmitted to the driven gear 19. At this time, the frictional forces f, f' are eliminated, and only the thrusting force by the springs 40, 41 acts on the supporting member 38, but given that the total thrusting force of the springs 40, 41 is set smaller than the thrusting force of the compression spring 27, the abutting member 25 moves the supporting member 38 in the leftward direction overcoming the thrusting force of the springs 40, 41, as shown in FIG. 32, until the projection 13 of the driving gear 12 and the projections 36a, 37a of the engaging members 36, 37 are completely set apart. Therefore, if vibration or other force is applied from outside, the engaging members 36, 37 and the driving gear 12 will not be unexpectedly exchanged with each other, so that a secure disengaging operation is effected.

The above explanation refers to the engagement between the projection 13 and engaging member 36, but the same applies to the engagement between the engaging member 37 and the projection 13.

Next, when the supporting plate 22 is moved from the state of not transmitting the torque shown in FIG. 32 up to the position shown in FIG. 27 by a known means (such as solenoid), the supporting member 38 moves in the rightward direction in FIG. 32 by the thrusting force of the springs 40, 41 along with the movement of the abutting member 25, and either one of the projections 36a, 37a of the engaging members 36, 37 is engaged with the projection 13, so that the torque of the driving gear 12 is transmitted to the driven gear 19 by way of the supporting member 38.

At this time, the interval pitch of the projections 36a, 37a is set to be about half the pitch of the projection 13, and hence if the supporting plate 22 is moved from the position shown in FIG. 33 to the position in FIG. 27 at an arbitrary timing, at least one of the projections 36a, 37a is in an easily engaged with the projection 13, so that a quick engaging action is obtained without time delay.

Or if one of the engaging members 36, 37 is broken owing to some cause, a specified operation is effected by the remaining one, so that the reliability is also high.

In the above description, meanwhile, the rotation of the driving gear 12 is clockwise, but, not to mention, the same operation and effect are obtained if rotated counterclockwise.

The projection 13 is provided inside the driving gear 2, but it is not limited to the shape shown in the drawing, and a gear may be formed or a pin may be provided, instead.

Incidentally, two engaging members 36, 37 are used in this embodiment, but three or more engaging members may be also provided.

What is claimed is:

1. A clutch assembly, comprising:
   a driving member;
   an engaging member movable between an engaged position where said engaging member engages said driving member and a predetermined released position where said engaging member is apart by a predetermined distance from said driving member;
   a first thrusting means for thrusting said engaging member toward the engaged position;
   a driven member having mounted thereon said engaging member and said first thrusting means, said driven member being driven by said driving member through said engaging member when said engaging member is in the engaged position;
   a releasing means, comprising a releasing member movable between a position where said releasing member is apart from said engaging member and a position where said releasing member abuts against said engaging member, for enabling a driving force of said driving member transmitted through said engaging member to said releasing member to cause a reaction force of said releasing member to be applied to said engaging member to move said engaging member toward the released position until said engaging member disengages from said driving member; and
   said releasing means further comprising a second thrusting means for thrusting said engaging member through said releasing member toward the released position to move said engaging member to the released position after said engaging member has disengaged from said driving member.

2. A clutch assembly according to claim 1, wherein a thrusting force against said engaging member by said first thrusting means is smaller than a thrusting force against said releasing member by said second thrusting means.

3. A clutch assembly according to claim 1, wherein said driving member is a rotational driving member, and said driven member rotates coaxially and integrally with said driving member through said engaging member.

4. A clutch assembly according to claim 1, wherein said engaging member is loosely coupled to said driven member so as to be freely rotatable in a rotating direction of said driving member within a relatively small angular range of movement with respect to said driven member.

5. A clutch assembly according to claim 1, wherein said releasing member further has a means for restricting movement of said driven member after said engaging member has been disengaged from said driving member.

6. A clutch assembly comprising:
   a driving member;
   an engaging member movable between an engaged position where said engaging member engages said driving member and a predetermined released position where said engaging member is apart by a predetermined distance from said driving member;
   a first thrusting means for thrusting said engaging member toward the engaged position;
   a driven member having mounted thereon said engaging member and said first thrusting means, said driven member being driven by said driving member through said engaging member when said engaging member is in the engaged position; and
   a releasing means for releasing said engaging member from said driving member, said releasing means comprising:
   a supporting member movable between an active position where said releasing means acts on said engaging member and an inactive position where said releasing means does not act on said engaging member;
   a releasing member supported on said supporting member for abutting against said engaging member when said supporting member is in said active position, said releasing member being movable between a first position and a second position on said supporting member; and
   a second thrusting means for thrusting said releasing member in a direction from said second position to said first position;
   wherein said releasing means for releasing said engaging member from said driving member, with said releasing member abutting said engaging member, enables a driving force of said driving member transmitted through said engaging member to move said releasing member from said first position to said second position and enables the driving force of said driving member transmitted through said engaging member to said releasing member in said second position to cause a reaction force of said releasing member to be applied to said engaging member to move said engaging member toward the released position until said engaging member disengages form said driving member, said second thrusting means then moving said releasing means from said second position to said first position after said engaging member has disengaged from said driving member to thereby move said engaging member to said released position.

7. A clutch assembly according to claim 6, wherein a thrusting force against said engaging member by said first thrusting means is smaller than a thrusting force against said releasing member by said second thrusting means.

8. A clutch assembly according to claim 6, wherein said releasing member has a means for restricting a movement of said driven member when said engaging member has disengaged from said driving member.

9. A clutch assembly according to claim 8, wherein said means for restricting the movement of said driven member comprises a recess provided on said releasing member with which said engaging member engages said releasing member after having been disengaged from said driving member.

10. A clutch assembly according to claim 6, wherein said releasing member has a projection with which said releasing member abuts against said engaging member, said projection being gradually narrowed in width in the thrusting direction of said second thrusting means so as to have a side surface oblique with respect to the thrusting direction of said second thrusting means so that said engaging member is guided along said side surface when moved in direction to disengage from said driving member.

11. A clutch assembly according to claim 6, wherein said releasing member has a groove elongated in the thrusting direction of said second thrusting means, and said supporting member has mounted thereon two pins inserted through said groove so as to be abuttable against said releasing member at both ends of said groove, respectively, to define said first and second positions of said releasing member.

12. A clutch assembly comprising:
a driving member;
an engaging member movable between an engaged position where said engaging member engages said driving member and a predetermined released position where said engaging member is apart by a predetermined distance from said driving member;
a first thrusting means for thrusting said engaging member toward the engaged position;
a driven member having mounted thereon said engaging member and said first thrusting means, said driven member being driven by said driving member through said engaging member when said engaging member is in the engaged position; and
a releasing means for releasing said engaging member from said driving member, said releasing means comprising:
a supporting member movable between an active position where said releasing means acts on said engaging member and an inactive position where said releasing means does not act on said engaging member;
a releasing member supported on said supporting member for abutting against said engaging member when said supporting member is in said active position, said releasing member being movable between a first position and a second position on said supporting member; and
a second thrusting means for thrusting said releasing member in a direction from said second position to said first position;
wherein said driven member has an abutting portion against which said releasing member in said first position abuts when said supporting member is in said active position so that a driving force of said driving member transmitted through said engaging member and said driven member moves said releasing member to said second position; and
wherein said releasing member, having been moved to said second position, abuts against said engaging member, and said releasing means enables a driving force of said driving member transmitted through said engaging member to said releasing member to cause a reaction force of said releasing member to be applied to said engaging member to thereby move said engaging member toward said released position until said engaging member disengages from said driving member, said second thrusting means moving said releasing member from said second position to said first position after said engaging member has disengaged from said driving member to thereby move said engaging member to said released position.

13. A clutch assembly according to claim 12, wherein a thrusting force against said engaging member by said first thrusting means is smaller than a thrusting force against said releasing member by said second thrusting means.

14. A clutch assembly according to claim 12, wherein said releasing member further has means for restricting movement of said driven member when said engaging member has been disengaged from said driving member.

15. A clutch assembly according to claim 14, wherein said means for restricting the movement of said driven member comprises a recess provided on said releasing member with which said engaging member engages said releasing member after having been disengaged from said driving member.

16. A clutch assembly according to claim 12, wherein said releasing member has a projection with which said releasing member abuts said engaging member, said projection gradually narrowing in width in a thrusting direction of said second thrusting means so as to have a side surface oblique with respect to the thrusting direction of said second thrusting means so that said engaging member is guided along said side surface when moved in a direction to disengage from said driving member.

17. A clutch assembly according to claim 12, wherein said releasing member has a groove elongated in a thrusting direction of said second thrusting means, and said supporting member has mounted thereon two pins inserted through said groove so as to be abuttable against said releasing member at both ends of said groove, respectively, to define said first and second positions of said releasing member.

18. A clutch assembly according to claim 12, wherein said driving member is a reversible driving member, and said abutting portion of said driven member is divided into two subportions so that said releasing member abuts against one of said two subportions before abutting against said engaging member in whichever direction said driving member is driving said driven member.

19. A clutch assembly comprising:
   a driving member;
   an engaging member movable between an engaged position where said engaging member engages said driving member and a predetermined released position where said engaging member is apart by a predetermined distance from said driving member;
   a first thrusting means for thrusting said engaging member toward the engaged position;
   a driving member having mounted thereon said engaging member and said first thrusting means, said driven member being driven by said driving member through said engaging member when said engaging member is in the engaged position; and
   a releasing means for releasing said engaging member from said driving member, said releasing means comprising:
   a supporting member movable between an active position where said releasing means acts on said engaging member and an inactive position where said releasing means does not act on said engaging member;
   a releasing member supported on said supporting member for abutting against said engaging member when said supporting member is in said active position, said releasing member being movable between a first position and a second position on said supporting member; and
   a second thrusting means has thrusting said releasing member in a direction from said second position to said first position;
   wherein said driven member has an abutting portion against which said releasing member in said first position abuts when said support member is in said active position, and said releasing member has a first abutting portion for abutting against the abutting portion of said driven member so that a driving force of said driving member transmitted through said engaging member and said driven member moves said releasing member from said first position to said second position; and
   wherein said releasing means, with said releasing member having a second abutting portion for abutting against said engaging member after said releasing member has been moved to said second position, enables a driving force of said driving member transmitted through said engaging member to said second abutting portion of said releasing member to cause a reaction force of said releasing member to be applied to said engaging member to move said engaging member toward said released position until said engaging member disengages from said driving member, said second thrusting means moving said releasing means from said second position to said first position after said engaging member has disengaged form said driving m ember to thereby move said engaging member to said released position.

20. A clutch assembly according to claim 19, wherein a thrusting force against said engaging member by said first thrusting means is smaller than a thrusting force against said releasing member by said second thrusting means.

21. A clutch assembly according to claim 19, wherein said releasing member further has means for restricting movement of said driven member when said releasing member has disengaged from said driving member.

22. A clutch assembly according to claim 21, wherein said means for restricting the movement of said driven member comprises a recess provided on said releasing member at a position adjacent to said second abutting portion so that said engaging member engages said releasing member with said recess after having disengaged from said driving member.

23. A clutch assembly according to claim 19, wherein said second abutting portion of said releasing member is a projection gradually narrowing in width in a thrusting direction of said second thrusting means so as to have a side surface oblique with respect to the thrusting direction of said second thrusting means so that said engaging member is guided along said side surface when moved in a direction to disengage said engaging member from said driving member.

24. A clutch assembly according to claim 19, wherein said releasing member has a groove elongated in a thrusting direction of said second thrusting means, and said supporting member has mounted thereon two pins inserted through said groove so as to be abuttable against said releasing member at both ends of said groove, respectively, to define said first and second positions of said releasing member.

25. A clutch assembly according to claim 19, wherein said driving member is a reversible driving member, and said abutting portion of said driven member is divided into two subportions so that said first abutting portion of said releasing member abuts against one of said two subportions before said second abutting portion of said releasing member abuts against said engaging member in whichever direction said driving member is driving said driven member.

26. A clutch assembly according to claim 19, wherein said abutting portion of said driven member has a recess gradually narrowing in width in the thrusting direction of said first thrusting means, while said first abutting portion of said releasing member is a projection gradually widening in the thrusting direction of said second thrusting means so that said projection is smoothly inserted into said recess when said engaging member is abutted by said second abutting portion of said releasing member and moved to said released position by the thrusting force of said second thrusting means through said releasing member.

27. A clutch assembly comprising:
   a driving wheel;
   a plurality of engaging members movable between an engaged position where at lest one of said engaging members engages said driving wheel and a released position where said engaging members are apart by a predetermined distance from said driving wheel;
   a first thrusting means for thrusting said plurality of engaging members toward said engaged position;
   a supporting member for slidably supporting said plurality of engaging members;
   a driven wheel, having mounted thereon said supporting member and said first thrusting means, for rotation coaxially and integrally with said driving wheel through said supporting member when said engaging members are in said engaged position;

a releasing member movable between a position where said releasing member is apart from said supporting member and a position where said releasing member can abut against said supporting member so that a driving force of said driving wheel is transmitted through said at least one of said engaging members engaged said driving wheel and said supporting member to said releasing member to cause a reaction force of said releasing member to be applied to said supporting member to move said supporting member in such a direction in which said engaging members move toward said released position until said at least one of said plurality of engaging members engaging said driving wheel disengages from said driving wheel; and a second thrusting means for thrusting said supporting member through said releasing member to move said supporting member to a position where said engaging members are in said released position after said at least one of said plurality of engaging members engaging said driving wheel has disengaged from said driving wheel.

28. A clutch assembly according to claim 27, wherein a thrusting force against said engaging members by said first thrusting means is smaller than a thrusting force against said releasing member by said second thrusting means.

29. A clutch assembly according to claim 27, wherein a plurality of first engaging portions are provided at specified intervals on said driving wheel to be engaged with said plurality of engaging members, and second engaging portions are provided on respective said engaging members such that said second engaging portions are relatively positioned according to said specified intervals so that at least one of said second engaging portions can engage at least one of said first engaging portions of said driving wheel.

* * * * *